Oct. 20, 1925.
C. L. MORRETT
1,557,603
SAFETY HOOK
Filed March 14, 1925
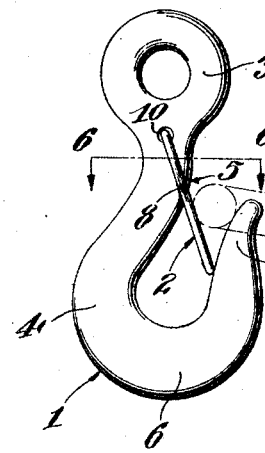
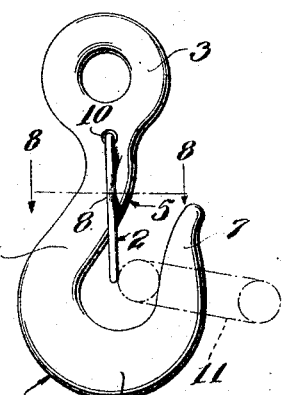
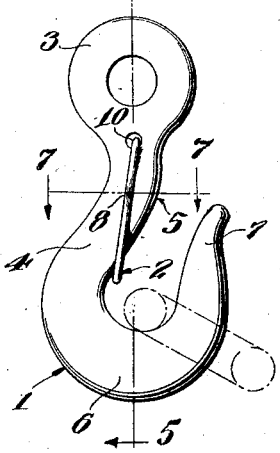
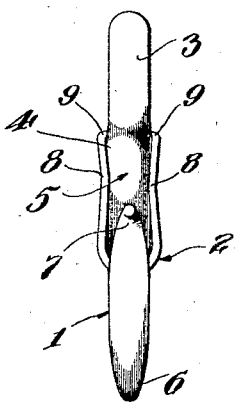
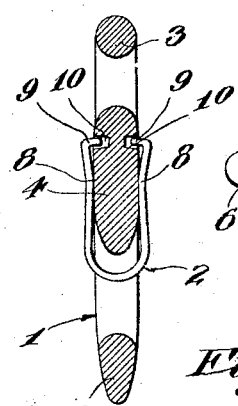
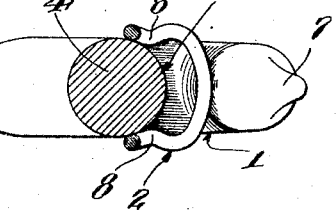
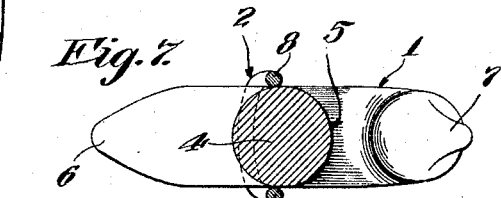
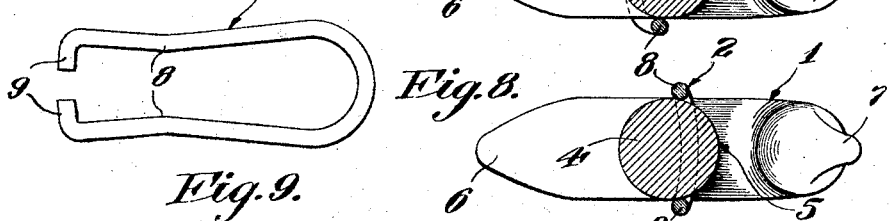
INVENTOR
Clarence L. Morrett
BY
Joshua R H Potts
HIS ATTORNEY
WITNESSES:

Patented Oct. 20, 1925.

1,557,603

UNITED STATES PATENT OFFICE.

CLARENCE L. MORRETT, OF PHILADELPHIA, PENNSYLVANIA, ASSIGNOR TO PHILADELPHIA HARDWARE AND MALLEABLE IRON WORKS, INC., OF PHILADELPHIA, PENNSYLVANIA.

SAFETY-HOOK.

Application filed March 14, 1925. Serial No. 15,467.

*To all whom it may concern:*

Be it known that I, CLARENCE L. MORRETT, a citizen of the United States, residing at Philadelphia, in the county of Philadelphia and State of Pennsylvania, have invented certain new and useful Improvements in Safety Hooks, of which the following is a specification.

My invention relates to safety hooks and more particularly to the type having spring wire latches for keeping the connecting member in the hook.

Some hooks have this spring latch pivoted on the end of the hook and others have it pivoted on the shank. One objection to these hooks is, that due to their complex shape, they are necessarily heavier than ordinary hooks and require more operations in the manufacture which makes them costly. Another objection is that the latch, necessarily projecting out of the space confined by the hook, is liable to be knocked, bent out of shape and opened when the hook is dragged along the ground.

The objects of my invention are to provide a hook of simple and strong construction which will positively keep the connecting member from escaping from the hook; which may be of simple shape, and in which the latch is always enclosed by the hook.

These objects, and other advantageous ends which will be described hereinafter, I attain in the following manner, reference being had to the accompanying drawing in which Figure 1 is a side view of a hook made in accordance with my invention.

Figure 2 a like view with the parts in another position,

Figure 3 a like view with the parts in a third position,

Figure 4 a right hand edge view of the hook shown in Figure 1,

Figure 5 a section on line 5—5 of Figure 3,

Figure 6 an enlarged section on line 6—6 of Figure 1,

Figure 7 a like view on line 7—7 of Figure 3,

Figure 8 a like view on line 8—8 of Figure 2, and

Figure 9 a plan view of an element forming a part of my invention.

Referring to the drawings, 1 indicates a hook adapted to be connected to a link or other connecting member, and 2 a spring latch for keeping the link or member within the hook. The hook has an eye 3 and a shank 4 provided with an arc-shaped inner face 5. The loop 6 and point 7 may be of the usual form. The space between the shank and the pointed part of the hook is bridged by latch 2 which yields to a chain link as it is forced into the hook and forms a rigid stop to prevent the link from slipping out of the hook. The latch is bent from spring wire into U-shape as shown in Figure 8 and the legs of the U are bent inwardly to provide longitudinally inclined projections 8 and the ends of the legs are bent inwardly to provide journals 9 which bear in holes 10 adjacent the eye. As the latch is swung, projections 8 are sprung apart by the curved diverging faces of the shank.

A chain link, as shown in dot-and-dash lines at 11 in Figures 1 and 2, when forced past latch 2 into the hook, will move the latch so that the inclined projections 8 will slide on and be wedged apart by the diverging shank faces. When the connecting link has passed beyond the latch, the tension of the latter, due to its legs having been sprung apart, causes the inclined projections to slide along the shank faces in reverse direction and bring the latch to its closed position.

The shank or the part of the shank which is engaged by the inclined projections slopes or curves rearwardly and forwardly from the line of its greatest transverse diameter. When the latch is not in use it may be kept out of the way by swinging it to the position shown in Figure 3 so that its free end contacts with the shank. Its projections 8 then engage with or pass beyond the line of greatest diameter and the latch will be held in the open position.

The latch, having its legs close to the shank and being within the space confined by the hook, has no projecting parts to be knocked and bent out of shape or to cause the latch to be opened, when the hook is dragged along the ground. By utilizing the shank faces to spread the legs of the latch to obtain the tension necessary for keeping it in open or closed position, an ordinary hook may be used with the latch, thus avoiding hooks of complex shape.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A hook including a shank provided with an arc-shaped inner face, and a U-shaped spring latch pivoted to the hook above the curve, and adapted when in locking position to engage the hook part of the latch, the legs of the latch having inclined inward projections adapted, when the latch opens to receive a link, to engage the curved face of the shank and to be thereby automatically returned to locking position.

2. A hook including a shank provided with an arc-shaped inner face, and a U-shaped spring latch pivoted to the hook above the curve, and adapted when in locking position to engage the hook part of the latch, the legs of the latch being adapted, when the latch opens to receive a link, to engage the curved face of the shank and to be thereby automatically returned to locking position and when the latch is not in use to take over the shank and hold the latch in idle position.

3. A hook including a shank provided with an arc-shaped inner face, and a U-shaped spring latch having bent ends pivoted to the hook above the curve, and adapted when in locking position to engage the hook part of the latch, the legs of the latch having inclined inward projections adapted, when the latch is not in use to take over the shank and hold the latch in open position.

In testimony whereof I have signed my name to this specification.

CLARENCE L. MORRETT.